United States Patent [19]

Sturgeon

[11] Patent Number: 4,926,303
[45] Date of Patent: May 15, 1990

[54] CONTROL CIRCUIT FOR A SWITCHING DC TO DC POWER CONVERTER INCLUDING A MULTI-TURN CONTROL TRANSFORMER

[75] Inventor: Clayton L. Sturgeon, Watauga, Tex.

[73] Assignee: Qualitron, Inc., Dallas, Tex.

[21] Appl. No.: 283,153

[22] Filed: Dec. 12, 1988

[51] Int. Cl.⁵ .............................................. H02M 3/338
[52] U.S. Cl. ........................................ 363/19; 363/21; 363/97
[58] Field of Search ............................ 363/19, 21, 97

[56] References Cited

U.S. PATENT DOCUMENTS

| | | | |
|---|---|---|---|
| 3,134,940 | 5/1964 | Massey et al. | 363/19 |
| 3,541,420 | 11/1970 | Rees | 363/21 |
| 4,323,961 | 4/1982 | Josephson | 363/21 |
| 4,347,559 | 8/1982 | Sturgeon | 363/21 |
| 4,744,020 | 5/1988 | Cavagnolo | 363/21 |

FOREIGN PATENT DOCUMENTS 2560697 9/1985 France ................................. 363/21

Primary Examiner—William H. Beha, Jr.
Attorney, Agent, or Firm—Ross, Howison, Clapp & Korn

[57] ABSTRACT

A control circuit for a power converter which includes a power transformer having a primary transformer winding for receiving an input voltage signal and a secondary transformer winding for generating an output signal provides control of the on and off time of the power transformer by utilizing a control transformer having a plurality of windings. A switch is provided which is coupled to the control transformer. The switch is conductive to render the power transformer on and when non-conducting renders the powder transformer off. Activacation of the switch is controlled through magnetic coupling between the windings of the control transformer to thereby render the output voltage of the power transformer constant while the switch on time remains constant and the switch off time is variable.

4 Claims, 2 Drawing Sheets

CONTROL CIRCUIT FOR A SWITCHING DC TO DC POWER CONVERTER INCLUDING A MULTI-TURN CONTROL TRANSFORMER

TECHNICAL FIELD

This invention relates to power systems and devices, and more particularly to a control circuit for controlling the duty cycle of a power converter.

BACKGROUND OF THE INVENTION

Control circuits are utilized for controlling the duty cycle of a power transformer within a magnetic power converter system. The on time and off time of a power switch which controls energization of the primary winding of the power transformer within the system may be controlled by integrated circuitry using external references which detect variations across the load of the system in order to maintain the output voltage constant. Additionally, such control circuits require isolating elements, for example, optical couplers in order to couple the output on the secondary side of the transformer to the primary side. Such circuitry is costly and requires numerous circuit elements in order to perform the control operation.

A need has thus arisen for a control circuit for use in a magnetic power converter which provides for efficient operation, high performance, but which accomplishes the control function with minimal electronic components thereby decreasing the circuit cost and increasing reliability.

SUMMARY OF THE INVENTION

In accordance with the present invention, a control circuit for a power converter which includes a power transformer having a primary transformer winding for receiving an input voltage signal and a secondary transformer winding for generating an output signal is provided. The control of the on and off time of the power switch, which in turn determines the on and off time of the power transformer, is accomplished utilizing a control transformer having a plurality of windings. A switch is provided which is coupled to the control transformer. The switch is conductive to render the power transformer on and when non-conducting renders the power transformer off. The state of the switch is controlled through magnetic coupling between the windings of the control transformer to thereby render the output voltage derived from the power transformer constant while the switch on time remains constant and the switch off time is variable.

In accordance with another aspect of the present invention, the on time of the switch which is coupled to the control transformer is also variable utilizing a feed forward circuit.

BRIEF DESCRIPTION OF DRAWINGS

For a more complete understanding of the present invention and for further advantages thereof, reference is now made to the following Description of the Preferred Embodiments taken in conjunction with the accompanying Drawings in which.

DETAILED DESCRIPTION OF THE PREFERRED EMBODIMENTS

Figure 1:
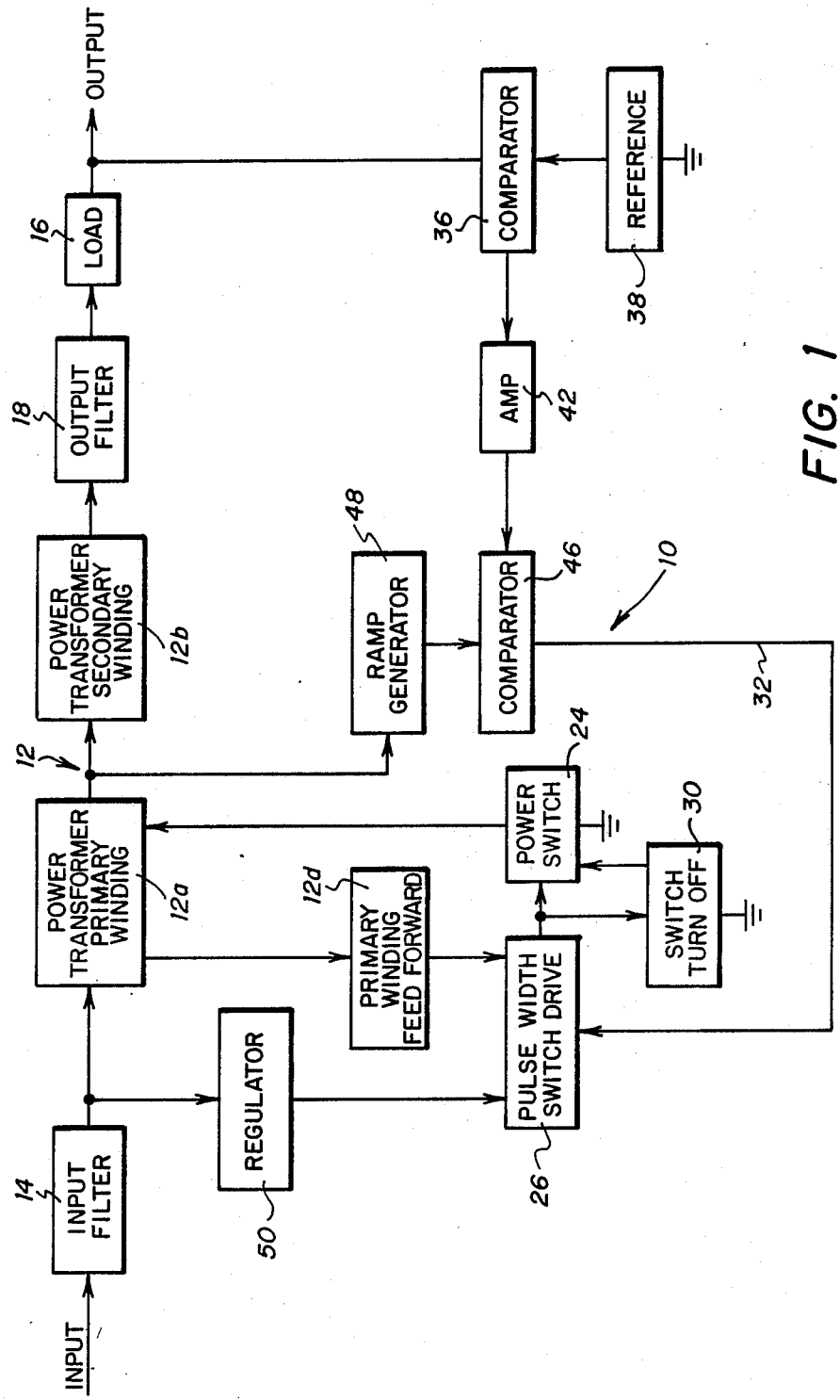
FIG. 1 is a block diagram of the present control circuit and a power converter.

Referring to FIG. 1, the present control circuit for a power converter is illustrated, and is generally identified by the numeral 10. Control circuit 10 is utilized for controlling the duty cycle of a power switch and transformer, generally identified by the numeral 12 having a primary winding 12a and a secondary winding 12b. Power transformer 12 receives an input signal via an input filter 14, and generates an output signal to a load 16 via an output filter 18. The duty cycle of power transformer 12 is controlled by the operation of a power switch 24 which is coupled to power transformer primary winding 12a. The energization and de-energization of power switch 24 is controlled by pulse width switch drive circuitry 26 which will be further described with respect to FIG. 2. Pulse width switch drive circuitry 26 includes a plurality of switches and a control transformer which is responsive to the output voltage of power transformer 12 in order to maintain the output voltage of power transformer 12 constant. Unlike previously developed control circuits, the present invention does not utilize any internal or external timing elements for controlling the duty cycle of the power transformer in the power converter system.

The off time of power switch 24 is controlled by pulse width switch drive circuitry 26 in combination with switch turn off circuitry 30. Pulse width switch drive circuitry 26 receives a feedback signal via signal line 32 which is developed from the output of power transformer secondary winding 12b. The output signal of power transformer 12 is applied to a comparator 36 which also receives a reference voltage level from reference 38. The output of comparator 36 is applied to an amplifier 42 whose output is applied to a comparator 46. Comparator 46 also receives a reference output voltage from a ramp generator 48 which includes an additional power transformer secondary winding 12c (FIG. 2) of power transformer 12. When present, the output of comparator 46 provides a feedback signal via signal line 32 to pulse width switch drive circuitry 26 which in turn activates a switch within switch turn off circuitry 30 to turn on power switch 24 and therefore terminate the off time of the duty cycle of the signal applied to power transformer 12.

The input signal is applied to pulse width switch drive circuitry 26 through a voltage regulator 50.

An additional aspect of the present invention is the control of the on time of power switch 24. Control of the on time of power switch 24 is variable through the use of an additional primary winding 12d of power transformer 12 to supply a feed forward signal to pulse width switch drive circuitry 26.

Figure 2:
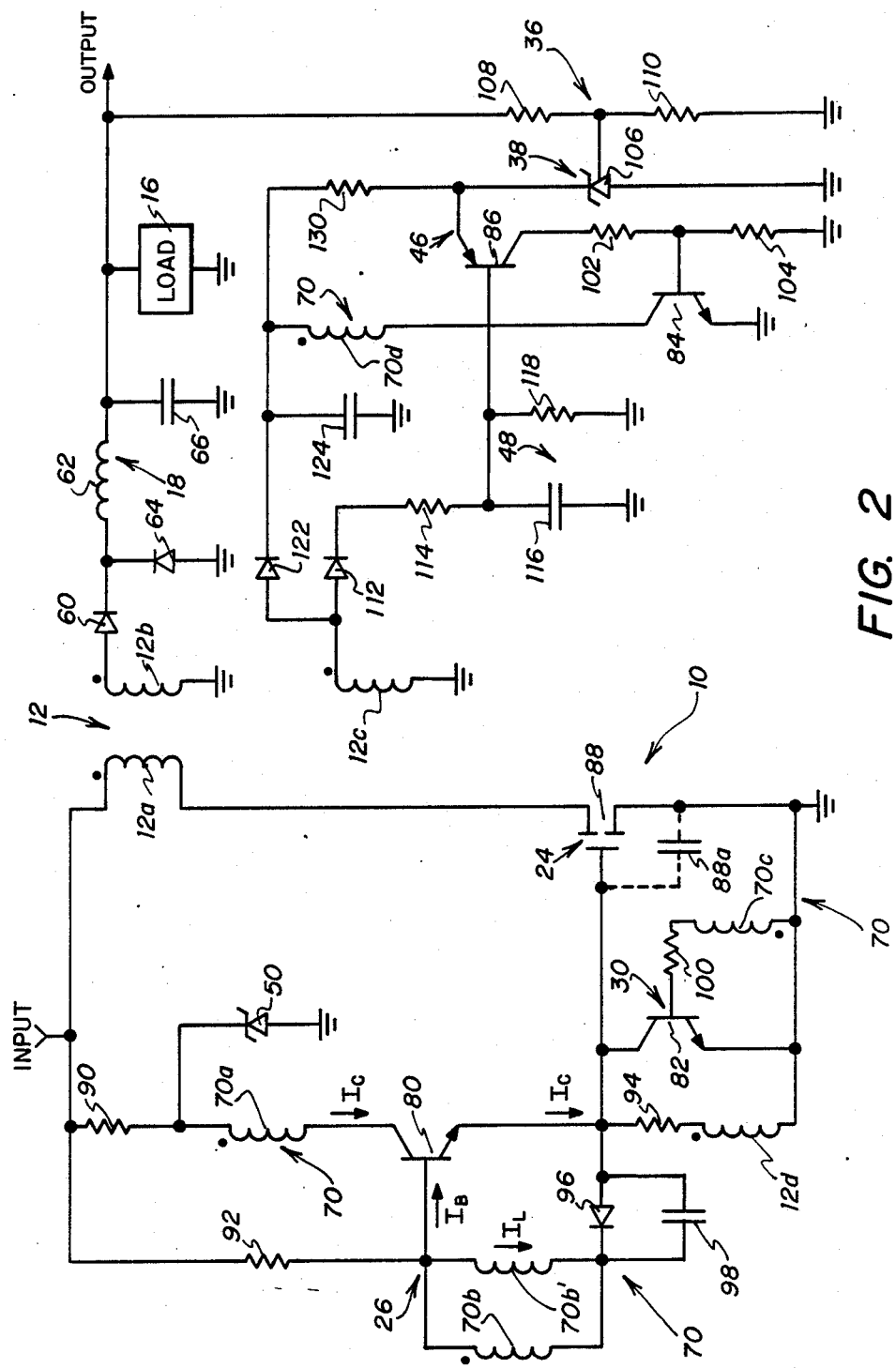
FIG. 2 is a schematic and electrical circuit diagram of the present control circuit.

The operation of the present control circuit 10 will now be described with respect to FIG. 2. Referring simultaneously to FIGS. 1 and 2, wherein like reference numerals are utilized for like and corresponding components previously identified, power transformer 12 includes primary windings 12a and 12d, and secondary windings 12b and 12c. The system input voltage is applied to power transformer primary winding 12a and the output voltage is generated from power transformer secondary winding 12b. Interconnected to power transformer secondary winding 12b is a diode 60 whose output is connected to output filter 18. Output filter 18 includes an inductor 62, a diode 64 and a capacitor 66. Pulse width switch drive circuitry 26 includes a control transformer 70 having windings 70a, 70b, 70c, and 70d. Control transformer windings 70a-d are wound on a single transformer. Pulse width switch drive circuitry 26 and switch turn off circuit 30 further includes four switches in the form of transistors 80, 82, 84, and 86. Power switch 24 may comprise, for example, a field effect transistor 88.

The input voltage signal is applied to control transformer winding 70a through a resistor 90 and to the base of transistor 80 through a resistor 92. The emitter of transistor 80 is interconnected to a resistor 94 which is connected to primary winding 12d of power transformer 12. The emitter of transistor 80 is also interconnected to winding 70b of control transformer 70 via a diode 96 and parallel connected capacitor 98. The base of transistor 82 is interconnected to winding 70c of control transformer 70 via a resistor 100. The base of transistor 84 is interconnected to resistors 102 and 104.

Reference voltage source 38 may comprise, for example, a programmable zener diode 106, the cathode of which is connected to the emitter of transistor 86. The input of programmable zener 106 is connected to resistors 108 and 110 which receive the output voltage signal from power transformer secondary winding 12b.

Power transformer secondary winding 12c is interconnected to the base of transistor 86 via a diode 112 and a resistor 114, a capacitor 116 and a resistor 118. Power transformer secondary winding 12c is interconnected to winding 70d of control transformer 70 via a diode 122 and capacitor 124. The output of power transformer secondary winding 12c is also applied to the emitter of transistor 86 via a resistor 130.

Having now identified the interconnections among control transformer 70 and transistors 80, 82, 84, 86 and switch field effect transistor 88, the operation of the present control circuit 10 will now be described. The input voltage applied to pulse width switch drive circuitry 26 and more specifically through resistors 90 and 92 initially caused transistor 80 to turn on. When transistor 80 is on, transistor 82 is off because of the reverse polarity of the voltage across winding 70c at the base of transistor 82. Transistor 80 is latched on and is self-driven by the current feedback in control transformer 70. Current flows through resistor 94 and into the gate of field effect transistor 88 turning field effect transistor 88 on. When the internal gate-source capacitance 88a of field effect transistor 88 is fully charged, current flowing into the gate of field effect transistor 88 ceases and a current $I_C$ drops to the value of current flowing through resistor 94. At this time, the current flowing within windings 70c and 70d of control transformer 70 is zero.

The base current flowing to transistor 80 begins to decrease as the transformer exciting current $I_L$ shown in FIG. 2 flowing through an inductor 70b' for illustrative purposes only, it being understood that inductor 70b' is not an actual circuit component but is the exciting inductance of control transformer 70. When the base current $I_B$ goes to zero, transistor 80 regeneratively turns off. Simultaneously, the inductive kick back of control transformer 70 and particularly winding 70c rapidly turns transistor 82 on to discharge the gate-source capacitance of field effect transistor 88 which very rapidly turns field effect transistor 88 off. The turn off of field effect transistor 88 is initiated when the current flowing within inductor 70b' is equal to the current within winding 70b of control transformer 70 such that the current $I_B$ is equal to zero.

The voltage across inductor 70b' is constant and is equal to the diode drop across diode 96 plus the base-emitter voltage drop across transistor 80. Therefore, the current $I_L$ is a ramp function. The current flowing within winding 70b of control transformer 70 is constant after field effect transistor 88 turns on and is determined by the value of resistor 94 and the voltage across this resistor. The on time of field effect transistor 88, the pulse width, is then determined by the values of inductance 70b', resistor 94, the turns ratio between windings 70a and 70b, the voltage across resistor 94, the base-emitter drop of transistor 80 and the voltage drop across diode 96. If any of these parameters or voltages are caused to vary, the pulse width of the activation pulse applied to power transformer primary winding 12a will vary accordingly.

When field effect transistor 88 is turned off, it remains off until it is pulsed back on through operation of transistor 84. Programmable zener 106 sets a voltage level that is dependent on the output voltage of power transformer secondary winding 12b. Programmable zener 106 functions as a reference voltage and error amplifier. When field effect transistor 88 is turned on, secondary winding 12c of power transformer 12 charges capacitor 116 to a value of the ratio of the turns between secondary winding 12c and primary winding 12a of power transformer 12 multiplied by the input voltage applied to primary winding 12a. The charged voltage level of capacitor 116 is higher than the voltage at the emitter of transistor 86 and therefore transistors 86 and 84 are turned off.

The voltage on the base of transistor 86 begins to decrease as capacitor 116 discharges through resistor 118. When this voltage level drops lower than the voltage level appearing at the emitter of transistor 86, transistor 86 turns on which in turn turns on transistor 84. Transistor 84 then pulses winding 70d of control transformer 70 which pulse is magnetically coupled to winding 70b thereby turning on transistor 80. When transistor 80 is on, as previously stated, field effect transistor 88 is turned on, thereby terminating the off period of field effect transistor 88. This off time is regulated in order to maintain the output voltage of power transformer 12 constant. Variations in the output voltage is determinative of when transistor 84 will conduct in order to pulse winding 70d which in turn actuates transistor 80. The ramp generator 48 (FIG. 1) function is performed by capacitor 116 and resistor 118. Comparator 46 function is performed by transistor 86. Switch turn off circuitry 30 (FIG. 1) includes transistor 84 and winding 70d of control transformer 74.

Control circuit 10 thereby generates a feedback pulse, magnetically induced, from winding 70d of control transformer 70 to winding 70b of control transformer 70 to thereby terminate the off period of power transformer 12.

Variations in the on time of power transformer 12 are accomplished by the present control circuit 10 by sensing variations in the input voltage through power transformer primary winding 12d. The induced voltage of winding 12d effects the current flowing through resistor 94 which effects the on time of field effect transistor 88.

Whereas ramp generator 48 (FIG. 1) has been shown as comprising capacitor 116 and resistor 118 in combination with secondary winding 12c of power transformer 12, other internal voltage references may be utilized with the present invention for generating a reference voltage level for operation of transistor 86.

It therefore can be seen that the present invention provides for a magnetically controlled control circuit for a power transformer. Changes in the output voltage are sensed, and through magnetic coupling, the off time of the power transformer primary winding is controlled. The present invention therefore provides for a control circuit which is simple in operation, reliable and cost effective.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A control circuit for a power converter, the converter including a power transformer including a primary transformer winding for receiving an input voltage signal and a secondary transformer winding for generating an output voltage, the control circuit controlling the on and off time of the power transformer, comprising:
    a transformer having first, second, third and fourth windings, said first winding being connected to receive the input voltage signal;
    first switch means connected to said second winding of said transformer and to said third winding of said transformer and to said power transformer primary winding for controlling the on and off time of the power transformer corresponding to the on and off time of said first switch means;
    second switch means connected to said first, second, and third windings of said transformer for controlling the on time of said first switch means;
    third switch means connected to said fourth winding of said transformer and to the secondary winding of the power transformer for receiving the output voltage signal and for controlling the off time of said first switch means;
    said first switch means being rendered on when said second switch means is on, said second switch means being on due to current flowing in said transformer, and upon termination of current flow in said first winding due to conduction of said first switch means, said second switch means is rendered off causing the stored energy in said third winding to deactuate said first switch means to start the off time of the power transformer; and
    said third switch means rendered conductive when said first switch means is off and when changes in the output voltage exceed a pre-determined reference level, said third switch means pulses said fourth winding which in turn pulses said second winding to activate said second switch means thereby turning said first switch means on to terminate the off time of said first switch means and the off time of the power transformer.

2. The control circuit of claim 1 and further including:
    a capacitor and a resistor connected in parallel with the secondary transformer winding of the power transformer for generating said predetermined reference voltage level.

3. A control circuit for a power converter, the converter including a power transformer including a primary transformer winding for receiving an input voltage signal and a secondary transformer winding for generating an output voltage, the control circuit controlling the on and off time of the power transformer, comprising:
    a transformer having first, second, third and fourth windings, said first winding being connected to receive the input voltage signal;
    a first switch connected to said first winding and to said second winding;
    a second switch connected to said second winding and to said third winding;
    a third switch connected to said second winding and to said third winding and to said power transformer primary winding for controlling the on and off time of the power transformer corresponding to the on and off time of said third switch;
    a fourth switch connected to said fourth winding;
    a fifth switch connected to said fourth switch and to the secondary winding of the power transformer for receiving the output voltage signal;
    said third switch being rendered on when said first switch is on and said second switch is off, said first switch being on due to current flowing in said transformer, and upon termination of current flow in said first winding due to conduction of said third switch, said first switch is rendered off causing the stored energy in said third winding to actuate said second switch which in turn deactuates said third switch to start the off time of the power transformer; and
    said fifth switch rendered conductive when said third switch is off and when changes in the output voltage exceed a pre-determined reference level to thereby turn said fourth switch on, said fourth switch in turn pulsing said fourth winding which in turn pulses said second winding to activate said first switch thereby turning said third switch on to terminate the off time of said third switch and the off time of the power transformer.

4. The control circuit of claim 3 and further including:
    a capacitor and a resistor connected in parallel with the secondary transformer winding of the power transformer for generating said predetermined reference voltage level.

* * * * *